(12) United States Patent
Briggs et al.

(10) Patent No.: US 11,044,276 B2
(45) Date of Patent: Jun. 22, 2021

(54) CELLULAR SECURITY FRAMEWORK

(71) Applicant: Apple Inc., Cupertino, CA (US)

(72) Inventors: Elliot S. Briggs, Santa Cruz, CA (US); Jason A. Novak, San Francisco, CA (US); Samuel D. Post, Great Falls, MT (US); Zhu Ji, San Jose, CA (US)

(73) Assignee: Apple Inc., Cupertino, CA (US)

( * ) Notice: Subject to any disclaimer, the term of this patent is extended or adjusted under 35 U.S.C. 154(b) by 326 days.

(21) Appl. No.: 16/105,489

(22) Filed: Aug. 20, 2018

(65) Prior Publication Data

US 2019/0068651 A1 Feb. 28, 2019

Related U.S. Application Data

(60) Provisional application No. 62/549,783, filed on Aug. 24, 2017.

(51) Int. Cl.
*H04L 29/06* (2006.01)
*H04L 12/24* (2006.01)
(Continued)

(52) U.S. Cl.
CPC .......... *H04L 63/205* (2013.01); *H04L 41/082* (2013.01); *H04W 12/06* (2013.01);
(Continued)

(58) Field of Classification Search
CPC ................ H04L 63/205; H04L 41/082; H04L 63/1416; H04L 63/20; H04L 63/1433;
(Continued)

(56) References Cited

U.S. PATENT DOCUMENTS 9,191,823 B2 11/2015 Rieger et al.
2006/0276173 A1* 12/2006 Srey ................... H04W 12/128
455/410

(Continued)

OTHER PUBLICATIONS

Racherla, Gopal; Saha, Debashis. Security and privacy issues in wireless and mobile computing. 2000 IEEE International Conference on Personal Wireless Communications. Conference Proceedings (Cat. No.00TH8488). https://ieeexplore.ieee.org/stamp/stamp.jsp?tp=&arnumber=905910 (Year: 2000).*

(Continued)

*Primary Examiner* — Jeremiah L Avery
(74) *Attorney, Agent, or Firm* — Dickinson Wright RLLP

(57) ABSTRACT

A wireless device determines a location, identifies a mobile network operator (MNO), and/or experiences a network event. In some instances, the wireless device recognizes a base station as being operated by the MNO. Based on the location, the MNO and/or the network event, the wireless device determines a security action. The security action can include one or more of: (i) ignoring a network command associated with the network event, (ii) providing an alert notification via a user interface of the wireless device alerting a user of a security risk associated with the location, MNO, and/or network event, or (iii) ignoring communication from the base station temporarily or for an indefinite period of time. In some instances, the security action includes proceeding with normal communication with the base station at the location using network services of the MNO.

20 Claims, 8 Drawing Sheets

(51) Int. Cl.
*H04W 12/06* (2021.01)
*H04W 48/04* (2009.01)
*H04W 12/37* (2021.01)
*H04W 12/63* (2021.01)
*H04W 12/68* (2021.01)
*H04W 12/122* (2021.01)
*H04W 88/08* (2009.01)
*H04W 76/27* (2018.01)
*H04W 88/02* (2009.01)
*H04W 64/00* (2009.01)

(52) U.S. Cl.
CPC ......... *H04W 12/122* (2021.01); *H04W 12/37* (2021.01); *H04W 12/63* (2021.01); *H04W 12/68* (2021.01); *H04W 48/04* (2013.01); *H04W 64/00* (2013.01); *H04W 76/27* (2018.02); *H04W 88/02* (2013.01); *H04W 88/08* (2013.01)

(58) Field of Classification Search
CPC ............. H04W 48/04; H04W 12/1202; H04W 12/00503; H04W 12/00508; H04W 12/0027; H04W 12/06; H04W 64/00; H04W 88/08; H04W 76/27; H04W 88/02; H04W 12/00405; H04W 48/18; H04W 36/0022; H04W 12/12
See application file for complete search history.

(56) References Cited

U.S. PATENT DOCUMENTS

| | | | |
|---|---|---|---|
| 2008/0076393 A1* | 3/2008 | Khetawat | H04W 16/16 455/411 |
| 2011/0086614 A1* | 4/2011 | Brisebois | H04W 12/08 455/411 |
| 2011/0314145 A1* | 12/2011 | Raleigh | H04L 47/2475 709/224 |
| 2016/0226922 A1* | 8/2016 | Russell | H04L 65/1069 |
| 2017/0273134 A1* | 9/2017 | Cao | H04W 64/003 |

OTHER PUBLICATIONS

Chouchane, Alaaedine et al. Defending against rogue base station attacks using wavelet based fingerprinting. 2009 IEEE/ACS International Conference on Computer Systems and Applications. https://ieeexplore.ieee.org/stamp/stamp.jsp?tp=&arnumber=5069374 (Year: 2009).*

Huang, Jie; Huang, Chin-Tser. Secure Mutual Authentication Protocols for Mobile Multi-Hop Relay WiMAX Networks against Rogue Base/Relay Stations. 2011 IEEE International Conference on Communications (ICC), https://ieeexplore.ieee.org/stamp/stamp.jsp?tp=&arnumber=5963292 (Year: 2011).*

* cited by examiner

300

```
┌─────────────────────────────────────────────┐
│ DETERMINE A LOCATION, IDENTIFY AN MNO, AND/OR│
│        EXPERIENCE A NETWORK EVENT.          │
│                     301                     │
└─────────────────────────────────────────────┘
                      │
                      ▼
┌─────────────────────────────────────────────┐
│          DETERMINE A SECURITY ACTION.       │
│                     302                     │
└─────────────────────────────────────────────┘
```

*FIG. 3A*

CELLULAR SECURITY FRAMEWORK

CROSS-REFERENCE TO RELATED APPLICATIONS

This Application claims the benefit of U.S. Provisional Application No. 62/549,783, entitled "CELLULAR SECURITY FRAMEWORK," filed Aug. 24, 2017, which is incorporated by reference herein in its entirety for all purposes.

FIELD

The described embodiments set forth techniques for managing cellular wireless network security at a wireless device, including performing various security actions based on a location of the wireless device, observations of communication by a wireless network entity, and analysis of behavior of the wireless network entity using known mobile network operator wireless network security characteristics.

BACKGROUND

Wireless communication, by nature of transmission through an open medium, is vulnerable to eavesdropping. In addition, rogue network entities, such as fake base stations, can impersonate genuine network entities in order to obtain private information from a wireless device, to misdirect the wireless device to communicate with the rogue equipment, and/or to cause the wireless device to downgrade security settings rendering communication by the wireless device more vulnerable to snooping. When associating with a cellular wireless network, a wireless device can perform an authentication and key agreement (AKA) procedure and subsequently activate a security context with the cellular wireless network, including establishing a set of keys for encryption and decryption as well as for integrity protection and verification of messages communicated between the wireless device and the cellular wireless network. Prior to security activation with the cellular wireless network, however, messages may be communicated in a clear, readable, unencrypted format that is open to observation and may be subject to misuse. Additionally, rogue network entities may send messages to the wireless device to redirect the wireless device improperly to a lower security wireless network or to cause the wireless device to reveal private information such as an unencrypted identity, such as an international mobile subscription identity (IMSI), an international mobile equipment identity (IMEI), or a subscription permanent identifier (SUPI) of the wireless device. As the wireless device cannot verify integrity of messages received from network entities, whether genuine or rogue, before the security context is activated, the wireless device is vulnerable to security attacks.

SUMMARY

Representative embodiments set forth techniques for managing cellular wireless network security at a wireless device, e.g., a user equipment (UE), including performing various security actions based on a location of the wireless device, observations of communication by a wireless network entity, and analysis of behavior of the wireless network entity using known mobile network operator wireless network security characteristics. Security actions taken by the wireless device can be adapted based on a geographic region in which the wireless device is operating and on known characteristics of mobile network operators (MNOs) that operate in that geographic region. To protect against attacks from rogue network entities, e.g., fake base stations, the wireless device consults a network behavior template included in a security configuration for an MNO maintained at the wireless device. The security configuration can be obtained by the wireless device from a network-based server and refreshed periodically and/or in response to a network-triggered event. The wireless device can determine various security actions to take in response to a network-triggered event based on a location of the wireless device and information from the security configuration. As different MNOs can use different security procedures, the wireless device can adapt the security actions based on the MNO with which the wireless device is communicating (or with which the wireless device may communicate) and a region in which the wireless device operates.

The wireless device can recognize when commands received from a network entity are inconsistent with an MNO and/or a region in which the wireless device operates. In some embodiments, the wireless device ignores a network command that changes network security, e.g., when the network entity requests a connection with no ciphering or with weak ciphering, or when the network entity seeks to redirect the wireless device to use a wireless communication protocol with weaker network security, or when the network entity requests unencrypted identity information from the wireless device. In some embodiments, the wireless device provides an indication via a user interface of the wireless device to alert a user to the requested change in security or other questionable action requested by the network entity. In some embodiments, the wireless device requests confirmation via a user interface of the wireless device of whether to proceed to implement the network requested command. In some embodiments, the wireless device determines to bar communication with the network entity for a limited period of time. In some embodiments, the wireless device determines to add an entry to a blacklist for the network entity and bar communication with the wireless device for an unlimited period of time or until the entity in the blacklist is removed. In some embodiments, when barring or blacklisting a network entity, the wireless device stops communicating with the network entity and scans for another network entity with which to communicate.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Other aspects and advantages of the embodiments described herein will become apparent from the following detailed description taken in conjunction with the accompanying drawings which illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements.

FIGS. 3A and 3B illustrate exemplary logic for determining one or more security actions to take by a wireless device based on a location of the wireless device, according to some embodiments.

DETAILED DESCRIPTION

Figure 1A:
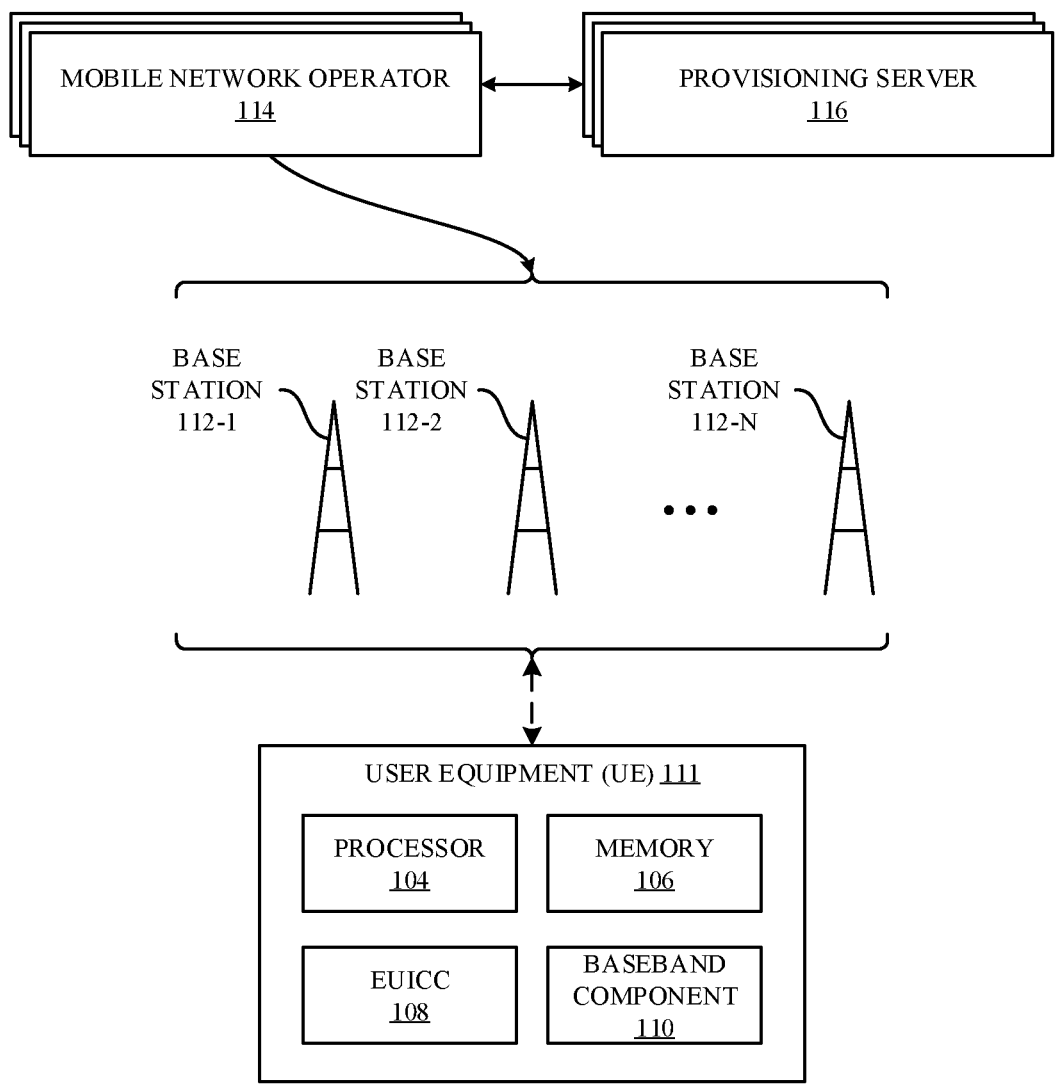
FIG. 1A illustrates a block diagram of different components of an exemplary system configured to implement the various techniques described herein, according to some embodiments.

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

Some cellular wireless system protocol specifications include security vulnerabilities that may be exploited by malicious actors. Various cellular wireless system protocols are used around the world and implemented by different commercial entities or mobile network operators (MNOs) in different countries or regions. Applying changes to the cellular wirless system protocols to mitigate identified vulnerabilities globally may be problematic. Some MNOs, also referred to as carriers, may not emphasize security, or use a different level of security than other MNOs. Some MNOs may seek to improve other functionalities of their systems over prioritizing applying patches to address security issues. In some scenarios, one or more vulnerabilities may be exploited by hostile entities, such as fake base station operators, using specifically adapted hardware such as, for example, fake base stations that seek to mimic communication protocols used by real base stations of an MNO. A fake base station operator may also be referred to herein as a hacker or as a malicious actor. Fake base stations are described in additional detail in U.S. patent application Ser. No. 15/610,230 entitled "Detection of a Rogue Base Station," filed May 31, 2017 (hereinafter "Detection Application"), which is incorporated by reference herein in its entirety for all purposes.

Representative security concerns include call interception, short message service (SMS) interception, eavesdropping, and location tracking. Examples of these are described at the following Internet URLs:

Ghost Telephonist: https://www.blackhat.com/us-17/briefings/schedule/#ghost-telephonist-link-hijack-exploitations-in-4g-lte-cs-fallback-6405

Eavesdropping: http://conference.hitb.org/hitbsecconf2016ams/sessions/forcing-a-targeted-lte-cellphone-into-an-eavesdropping-network/

Location Tracking: https://arxiv.org/pdf/1607.05171.pdf

Location Tracking: https://www.blackhat.com/eu-15/briefings.html#lte-and-imsi-catcher-myths A fake base station may be detected, in some instances, using parameters that are broadcast by the fake base station, e.g., based on a comparison of received parameters from the fake base station with known parameters used by real base stations. A fake base station operator, however, may adapt broadcast parameters over time to increase their difficulty of detection. Also, a wireless device that incorrectly classifies a legitimate base station as a fake base station may degrade the experience of the user of the wireless device, as the legitimate base station may be not used or avoided to be used even when available and possibly providing superior connections to another base station available for communication. A wireless device may check a base station identifier or MNO identifier included as a parameter in one or broadcast messages against a database of known fake base stations and/or a database of known legitimate base stations to determine whether broadcast messages received are legitimate or potentially fake. The user of the wireless device, however, may still experience negative impacts when parameters for a legitimate base station of a network changes over time and database information available to the wireless device for the legitimate base station is not up-to-date.

In embodiments presented herein, known carrier vulnerabilities are detected and potential harms due to such carrier vulnerabilities mitigated or eliminated. Regional awareness, such as location specific adaptive behavior, is applied to fake base station detection. Software changes provided herein in terms of logic allow a wireless device to selectively avoid or bypass performance of some parts of one or more cellular wireless protocol specifications. This selective avoidance or bypassing of particular procedures is done to avoid security threats that may affect the wireless device. A security configuration is determined by the wireless device based on a software bundle, where software bundles are periodically downloaded to the wireless device from one or more network-based servers. The wireless device determines its location and based on a portion of the software bundle associated with the location, takes security actions.

In some embodiments, a suspicion metric is used based on physical limitations of fake base stations. For Long Term Evolution (LTE) or LTE-Advanced (LTE-A) cellular wireless networks, a base station may be referred to as an evolved NodeB (eNodeB or eNB), while for fifth generation (5G) cellular wireless networks a base station may be referred to as a next generation NodeB (gNodeB or gNB). More information on detecting a fake base station based on physical limitations of the fake base stations is detailed in the Detection Application. Representative examples for detecting a fake base station may be based on:

interference signatures, signal timing and synchronization aspects, processing latency and turnaround time, computation and processing limits, and/or signal-level contradictions with a live network.

In some embodiments, a wireless device may use supplemental information to verify broadcast location information. A fake base station may broadcast false location information. A wireless device, in some embodiments, applies hysteresis to location information to compare current location information to past location information. For example, the wireless device can ignore sudden location jumps, where a location change is inconsistent with a time interval between reception (and/or determination) of a previous location and reception (and/or determination) of a current location by the wireless device. The cost of deception is thus increased for a hacker. In some embodiments, when the wireless device receives (and/or determines) inconsistent location information, the wireless device may query a user through a user interface of the wireless device to determine whether received (and/or determined) current location information is accurate. The wireless device may present to the user via the user interface a query, for example, "Are you in Hong Kong? Yes/No."

In some embodiments, the wireless device detects that an encryption of a ciphering configuration that a network entity of a cellular wireless network has established with the wireless device for a connection between the cellular wireless network and the wireless device is unusual. Examples of unusual ciphering for a wireless connection include no ciphering (transmission of data without encryption, which can also be referred to as transmission "in the clear") or weak ciphering. An example of weak ciphering is an encryption scheme for which a known successful attack (or code break technique) has been published. In some embodiments, when the wireless device detects a weak ciphering configuration (which can include a configuration with no encryption), the wireless device provides to the user via a user interface of the wireless device an indication, which may also be referred to a user interface (UI) indicator, to inform the user of the weak ciphering configuration. This indication can alert the user of the wireless device that ciphering for the connection with the cellular wireless network is not enabled or is using a weak ciphering setting and that the user is advised not to send sensitive data via the unencrypted or weakly encrypted connection, because the connection may be vulnerable to interception or eavesdropping by a third party, e.g., a hacker.

In accordance with various embodiments described herein, the terms "wireless communication device," "wireless device," "mobile device," "mobile station," and "user equipment" (UE) may be used interchangeably herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) Long Term Evolution (LTE), LTE Advanced (LTE-A), and/or fifth generation (5G) or other present or future developed advanced cellular wireless networks.

The wireless communication device, in some embodiments, can also operate as part of a wireless communication system, which can include a set of client devices, which can also be referred to as stations, client wireless devices, or client wireless communication devices, interconnected to an access point (AP), e.g., as part of a WLAN, and/or to each other, e.g., as part of a WPAN and/or an "ad hoc" wireless network. In some embodiments, the client device can be any wireless communication device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies.

Additionally, it should be understood that some UEs described herein may be configured as multi-mode wireless communication devices that are also capable of communicating via different third generation (3G) and/or second generation (2G) RATs. In these scenarios, a multi-mode user equipment (UE) can be configured to prefer attachment to LTE networks offering faster data rate throughput, as compared to other 3G legacy networks offering lower data rate throughputs. For instance, in some implementations, a multi-mode UE may be configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

These and other embodiments are discussed below with reference to FIGS. 1 through 4; however, those skilled in the art will readily appreciate that the detailed description given herein with respect to these figures is for explanatory purposes only and should not be construed as limiting.

FIG. 1A illustrates a block diagram of different components of an exemplary system 100 that is configured to implement the various techniques described herein, according to some embodiments. More specifically, FIG. 1A illustrates a high-level overview of the system 100, which, as shown, includes a user equipment (UE) 111, a group of base stations 112-1 to 112-n that are managed by different Mobile Network Operators (MNOs) 114, and a set of provisioning servers 116 that are in communication with the MNOs 114. The UE 111 can represent a mobile computing device (e.g., an iPhone® or an iPad® by Apple®), the base stations 112-1 to 112-n can represent cellular wireless network entities including evolved NodeBs (eNBs) and/or next generation NodeBs (gNBs or gNB) that are configured to communicate with the UE 111, and the MNOs 114 can represent different wireless service providers that provide specific services (e.g., voice and data) to which the UE 111 can be subscribed.

As shown in FIG. 1A, the UE 111 can include processing circuitry, which can include a processor 104 and a memory 106, an embedded Universal Integrated Circuit Card (eUICC) 108, and a baseband component 110. In some embodiments, the UE 111 includes one or more physical Subscriber Identity Module (SIM) cards (not shown) in addition to or substituting for the eUICC. The components of the UE 111 work in conjunction to enable the UE 111 to provide useful features to a user of the UE 111, such as localized computing, location-based services, and Internet connectivity. The eUICC 108 can be configured to store multiple electronic SIMs (eSIMs) for accessing different MNOs 114 through the base stations 112-1 to 112-n. For example, the eUICC 108 can be configured to store and manage one or more eSIMs for one or more MNOs 114 for different subscriptions to which the UE 111 is associated. To be able to access services provided by the MNOs, an eSIM can be provisioned to the eUICC 108. In some embodiments, the eUICC 108 obtains one or more eSIMs (or updates for one or more eSIMs) from one or more associated provisioning servers 116. It is noted that provisioning servers 116 can be maintained by a manufacturer of the UE 111, the MNOs 114, third party entities, and the like. Communication of eSIM data between a provisioning server 116 and the eUICC 108 (or between the provisioning server 116 and processing circuitry of the UE 111 external to the eUICC 108, e.g., the processor 104) can use a secure communication channel.

Figure 1B:
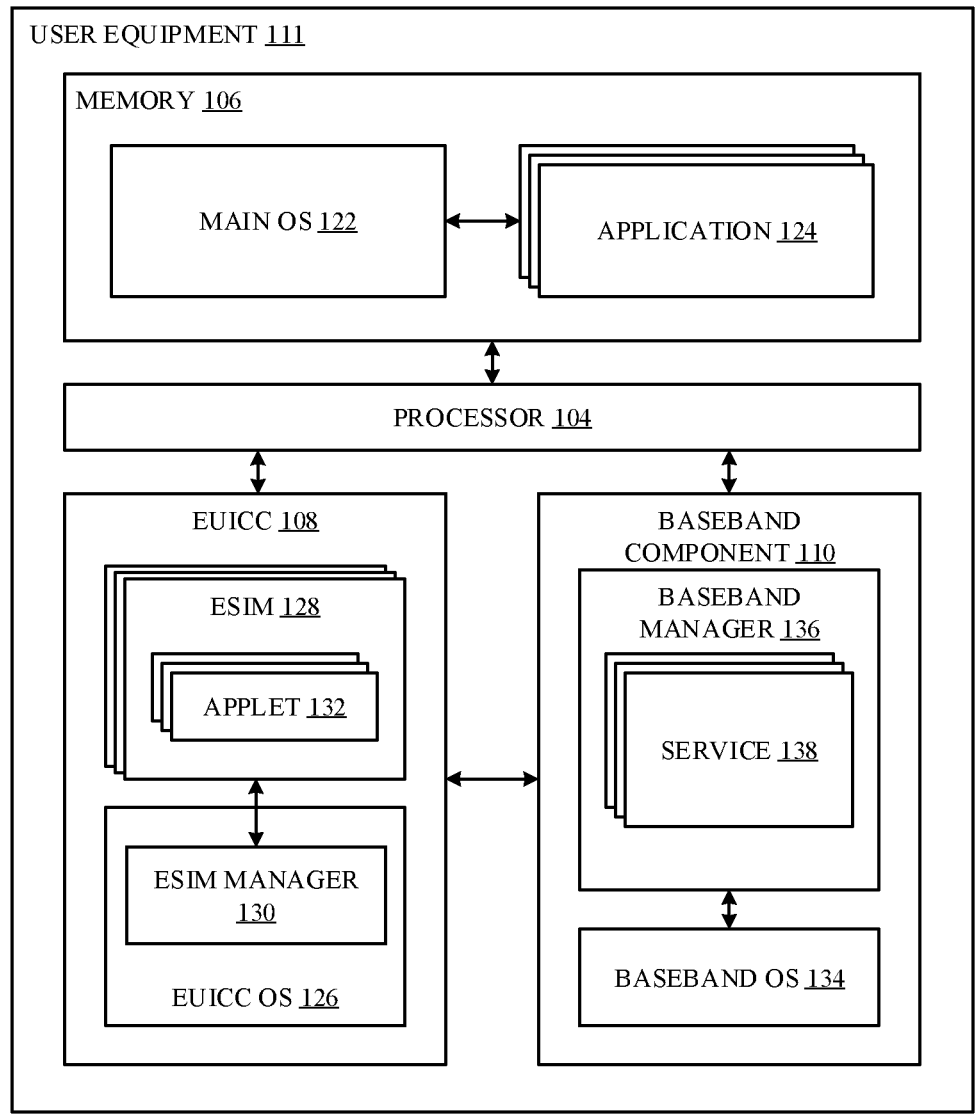
FIG. 1B illustrates a block diagram of a more detailed view of exemplary components of the system of FIG. 1A, according to some embodiments.

FIG. 1B illustrates a block diagram 120 of a more detailed view of particular components of the UE 111 of FIG. 1A, according to some embodiments. As shown in FIG. 1B, the processor 104, in conjunction with the memory 106, can implement a main operating system (OS) 122 that is configured to execute applications 124 (e.g., native OS applications and user applications). As also shown in FIG. 1B, the eUICC 108 can be configured to implement an eUICC OS 126 that is configured to manage the hardware resources of the eUICC 108 (e.g., a processor and a memory embedded in the eUICC 108). The eUICC OS 126 can also be configured to manage eSIMs 128 that are stored by the eUICC 108, e.g., by enabling, disabling, modifying, or otherwise performing management of the eSIMs 128 within the eUICC 108 and providing the baseband component 110 with access to the eSIMs 128 to provide access to wireless services for the UE 111. The eUICC 108 OS can include an eSIM manager 130, which can perform management functions for various eSIMs 128. According to the illustration shown in FIG. 1B, each eSIM 128 can include a number of applets 132 that define the manner in which the eSIM 128 operates. For example, one or more of the applets 132, when implemented by the baseband component 110 and the eUICC 108, can be configured to enable the UE 111 to communicate with an MNO 114 and provide useful features (e.g., phone calls and internet) to a user of the UE 111.

As also shown in FIG. 1B, the baseband component 110 of the UE 111 can include a baseband OS 134 that is configured to manage hardware resources of the baseband component 110 (e.g., a processor, a memory, different radio components, etc.). According to some embodiments, the baseband component 110 can implement a baseband manager 136 that is configured to interface with the eUICC 108 to establish a secure channel with a provisioning server 116 and obtaining information (such as eSIM data) from the provisioning server 116 for purposes of managing eSIMs 128. The baseband manager 136 can be configured to implement services 138, which represents a collection of software modules that are instantiated by way of the various applets 132 of enabled eSIMs 128 that are included in the eUICC 108. For example, services 138 can be configured to manage different connections between the UE 111 and MNOs 114 according to the different eSIMs 128 that are enabled within the eUICC 108.

Figure 1C:
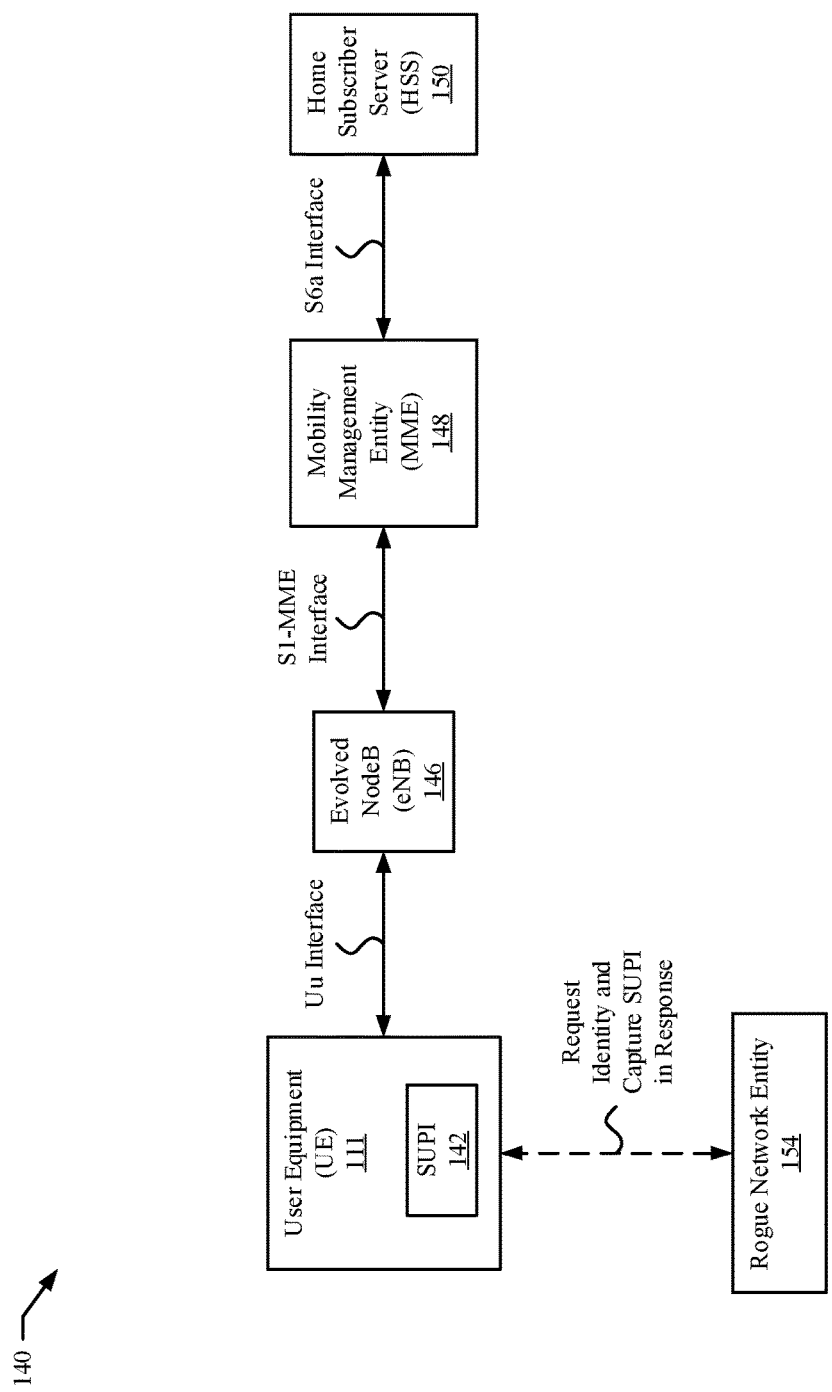
FIG. 1C illustrates a block diagram of an exemplary system subject to attack by a rogue network entity, according to some embodiments.

FIG. 1C illustrates a block diagram 140 of an exemplary system subject to attack by a rogue network entity. The system includes a UE 111, which includes private information, such as an unencrypted subscription permanent identifier (SUPI) 142 by which a subscription for a user of the UE 111 can be uniquely identified, in communication with an exemplary genuine cellular wireless network entity, namely an evolved NodeB (eNB) 146. An example of a SUPI 142 includes an international mobile subscriber identity (IMSI). The UE 111 and the eNB 146 can communicate via a Uu interface, which for some messages or for certain periods of time, such as prior to establishment of a secure connection between the UE 111 and the eNB 146, can be subject to eavesdropping by a third party, such as by the rogue network entity 154. While the eNB 146 connects to a Mobility Management Entity (MME) 148 of the core network via a secure S1-MME interface, and the MME 148 connects to a Home Subscriber Server (HSS) 150 via a secure S6a interface, the eNB 146 can send some messages to and receive some messages from the UE 111 "in the clear". The rogue network entity 154 can mimic communication from a genuine wireless network entity, such as from the eNB 146 and/or from the MME 148, and the rogue network entity 154 can request that the UE 111 provide information that should only be sent to a genuine wireless network entity. For example, the rogue network entity 154 can send a Request Identity message to the UE 111, which can unknowingly respond to the rogue network entity 154 with an Identity Response message that includes the unencrypted SUPI 142 of the UE 111. Other malicious actions can include the rogue network entity 154 sending messages to the UE 111 to cause the UE 111 to take actions that may establish an insecure or weakly secure connection or to downgrade security, such as to switch to using a wireless communication protocol that uses no encryption ciphering or weak encryption ciphering that may be vulnerable to attacks.

The Uu interface between the UE 111 and the eNB 146 is vulnerable to attacks in which the rogue network entity 154 seeks to extract information from the UE 111 and/or to misdirect the UE 111 to lower its security. Exemplary attacks include the rogue network entity 154 sending a radio resource control (RRC) redirection command as part of a CSFB procedure to cause the UE 111 to move to a fake base station (not shown) that imitates a wireless network that does not have advanced security measures, e.g., from a 4G/5G network eNB/gNB to a 2G/3G network. The rogue network entity 154 can also manipulate the UE 111 to obtain private information by re-appropriating error handling mechanisms, e.g., by requesting that the UE 111 send its SUPI 142 (IMSI) as a result of a fictitious UE context retrieval failure. Until a security context is established for access stratum (AS) communication between the UE 111 and the eNB 146 (or equivalently gNB) and for non-access stratum (NAS) communication between the UE 111 and the MME 148, messages received by the UE 111 may be suspect and subject to misuse. While FIG. 1C illustrates the UE 111 connected to the eNB 146 of an LTE network, a similar architecture for a fifth generation (5G) in which the UE 111 communicates through a next generation NodeB (gNB) is also subject to eavesdropping before a security context is established between the UE 111 and network entities of the wireless network.

Figure 2A:
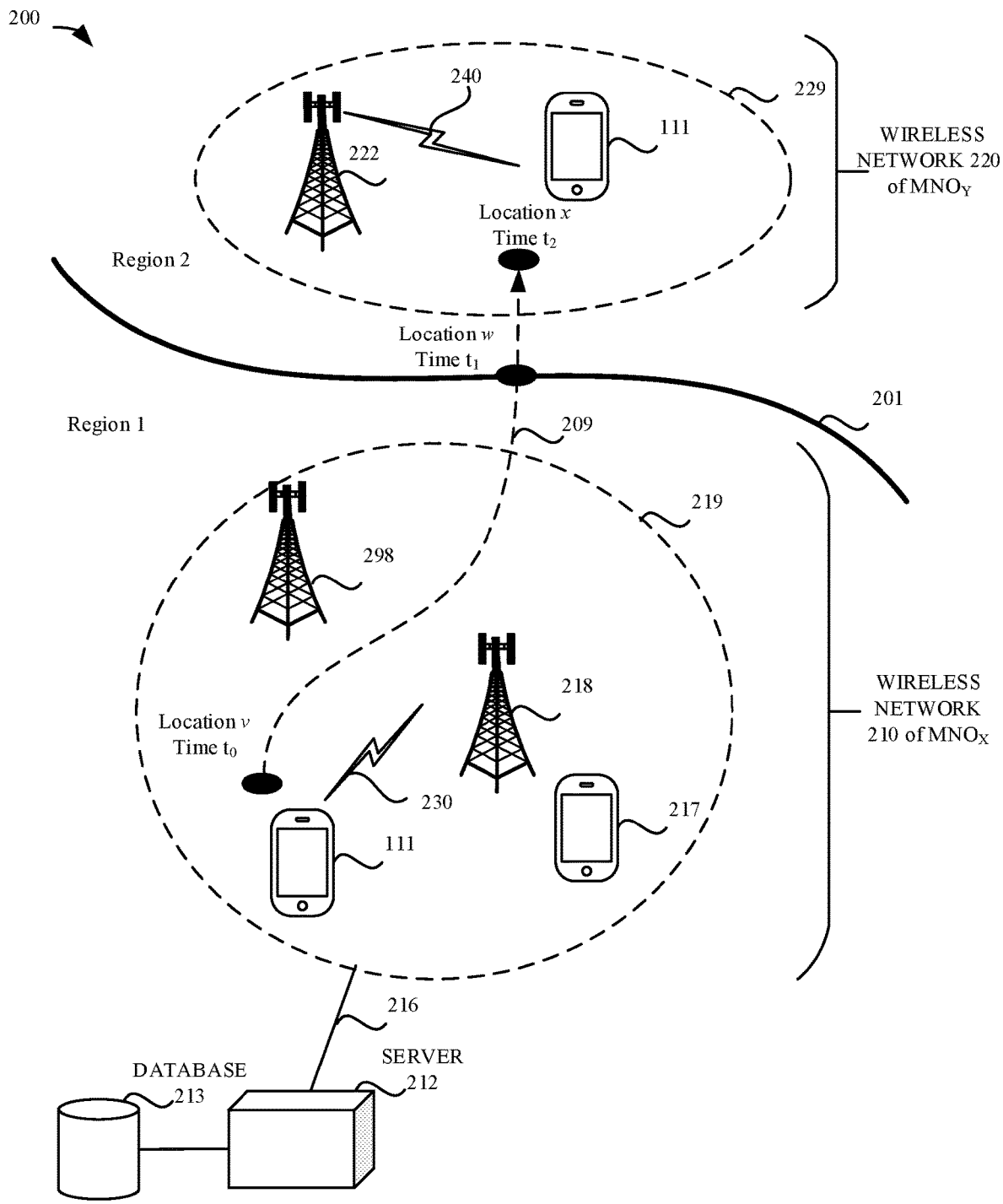
FIG. 2A illustrates an exemplary system in which a wireless device moves from a first region to a second region and takes a security action while located in the second region, according to some embodiments.

FIG. 2A illustrates a diagram 200 of an example of a wireless device 111 traversing between two different geographic regions. In a first geographic region, indicated as "region 1", a first mobile network operator, indicated as $MNO_X$, provides services via a first cellular wireless network 210. The first cellular wireless network 210 can be interconnected, via connection 216, with a network-based server 212 that maintains a database 213 of information that can be used for providing security information to the wireless device 111. At time t0, the wireless device 111 can be positioned at a location "v" in region 1. The wireless device 111 may be, for example, a smart phone, a tablet, a wearable device, such as a watch, or a laptop computer. The wireless device 111 moves along a path 209 from region 1 into a second geographic region, indicated as "region 2", in which a second mobile network operator, indicated as $MNO_Y$, provides services via a second cellular wireless network 220. At time $t_1$, the wireless device 111 passes through a schematic boundary 201 at a location "w". The wireless device 111 subsequently arrives at a location "x" at time t2 in region 2. Region 1 may be, for example, the United States, and region 2 may be, for example, China or India. In another example, region 1 may be a portion of the United States, and region 2 may be, a different portion of the United States, where each region is served by a different MNO.

While in region 1, the wireless device 111 can obtain access to services from the first cellular wireless network 210 of $MNO_X$ via a cellular wireless connection 230. The services of the first cellular wireless network 210 of $MNO_X$ can be provided to the wireless device 111 over the cellular wireless connection 230 via a base station 218, which can provide services over an area encompassed by the indicated boundary 219. Another wireless device 217 can also obtain access to services of the first cellular wireless network 210 of $MNO_X$ via a separate wireless connection (not shown). The first cellular wireless network 210 of $MNO_X$ can also include additional base stations, such as base station 298, that can also provide access to services of the first cellular wireless network 210.

After passing through the boundary 201 at location w, the wireless device 111 scans and detects the second cellular wireless network 220 of $MNO_Y$, which includes the base station 222. The wireless device 111 can obtain access to services from the second cellular wireless network 220 of $MNO_Y$ via a connection 240 with base station 222, which provides services over a coverage area encompassed by the indicated boundary 229. Periodically, or on an event-driven basis, the wireless device 111 refreshes a security configuration maintained by the wireless device 111. For example, a security configuration of the wireless device 111, in some embodiments, is refreshed based on information provided from the database 213 via the network-based server 212 (connection between the network-based server 212 and the second cellular wireless network 220 of $MNO_Y$ in region 2 is not shown explicitly in FIG. 2A but can exist just as with connection 216 for the first cellular wireless network 210 of $MNO_X$). In some embodiments, access to a common database 213 is provided on a global basis for wireless devices 111, e.g., in multiple regions, including in region 1 and region 2. In some embodiments, functionality of the database 213 is implemented in a distributed fashion using multiple network-based servers 212 that are distributed across different geographic regions, for example, to provide for redundancy and to avoid a single point of failure for access to information available from the database 213 via the network-based servers 212.

Figure 2B:
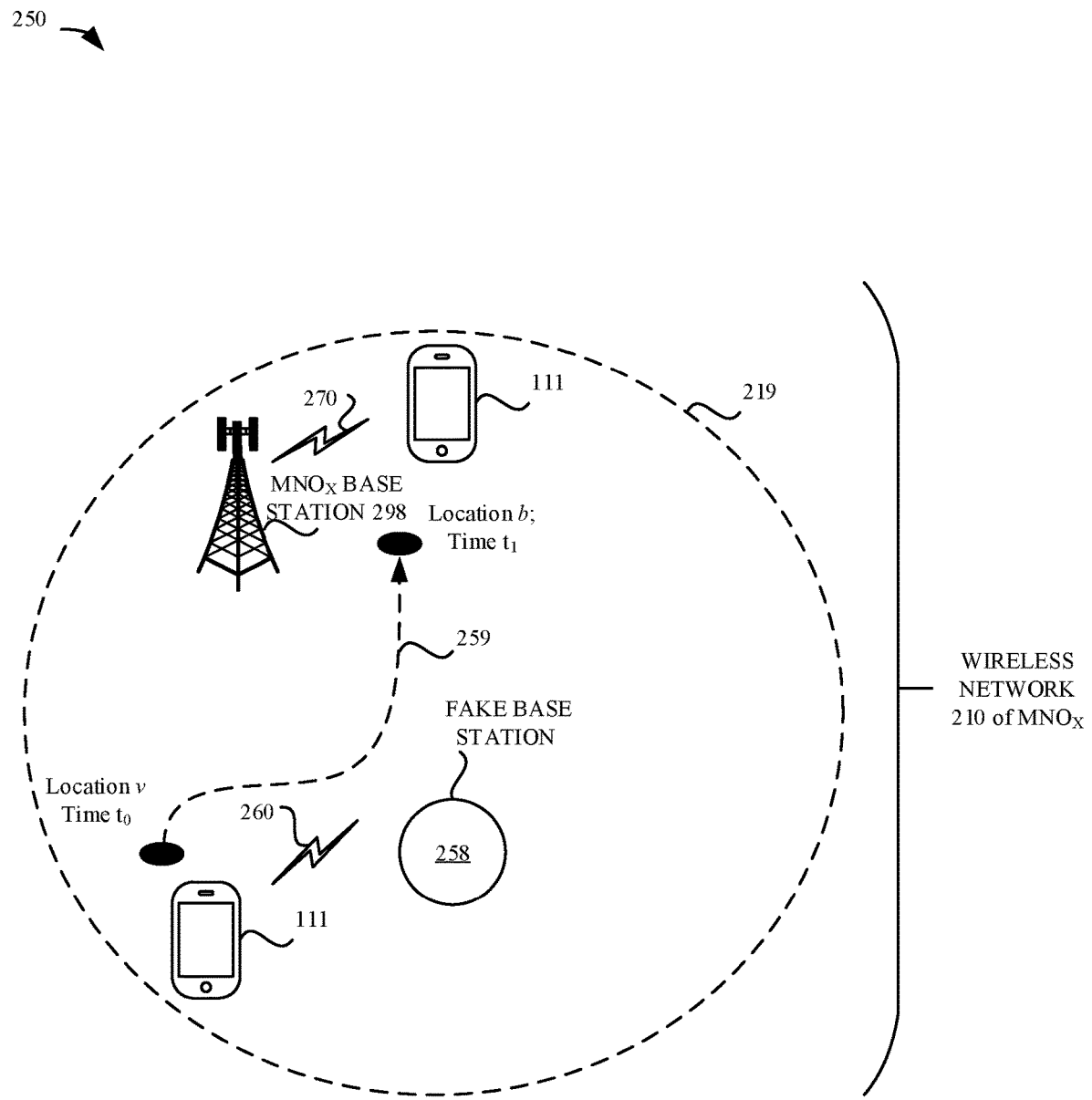
FIG. 2B illustrates an exemplary system in which a mobile device moves from communicating with a fake base station to a legitimate base station and takes a security action after leaving the vicinity of the fake base station, according to some embodiments.

FIG. 2B illustrates a diagram 250 of an exemplary scenario in which the wireless device 111 is initially, at a time to and at a location v, observing over a communication link 260 signals received from a fake base station 258. The wireless device 111 then moves along a path 259 and arrives at a location b at a time $t_1$, where both the first location v and the second location b are within an area defined by the boundary 219 of the wireless network 210 of $MNO_X$. The wireless device 111 can detect that the wireless device's location is b and that the base station 298 is operated by $MNO_X$. Security conditions may change based on the move from location v to location b. The wireless device 111 can determine a security action to execute and subsequently execute the determined security action at location b. This security action may include establishing a connection 270 with the first cellular wireless network 210 of $MNO_X$ via the base station 298, such as a data connection and/or a voice connection. The wireless device 111 can have avoided establishing a data connection or a voice connection with the fake base station 258 from which signals were received previously. (Note that the communication link 260 can indicate reception of signals sent by the fake base station 258, but need not indicate that a connection is established between the wireless device 111 and the fake base station 258.) In some embodiments, the wireless device 111 determines, based on one or more messages received from the fake base station 258 and on a comparison to information contained in a security configuration maintained by the wireless device 111, that the fake base station 258 is likely to not be as represented by itself, e.g., masquerading as a base station of $MNO_X$. In some embodiments, the wireless device 111 determines based on one or more messages received from the base station 298 of MNOX and a comparison with information contained in the security configuration maintained by the wireless device 111 that the base station 298 is genuine. As such, the wireless device can determine to ignore communication from the fake base station 258 and/or to bar the fake base station 258 temporarily for a time-limited period of time, and/or add the fake base station 258 to a blacklist for an unlimited period of time (or until later changed based on additional information or subsequent re-evaluation of the identity of the fake base station 258).

FIG. 3A illustrates a diagram 300 of exemplary logic for a cellular security framework, in accordance with some embodiments. At 301, a wireless device 111 determines a location, identifies a mobile network operator (MNO), and/or experiences a network event. At 302, the wireless device 111 determines a security action based on the determined location, based on an identity of the MNO, and/or based on the network event.

Figure 3B:
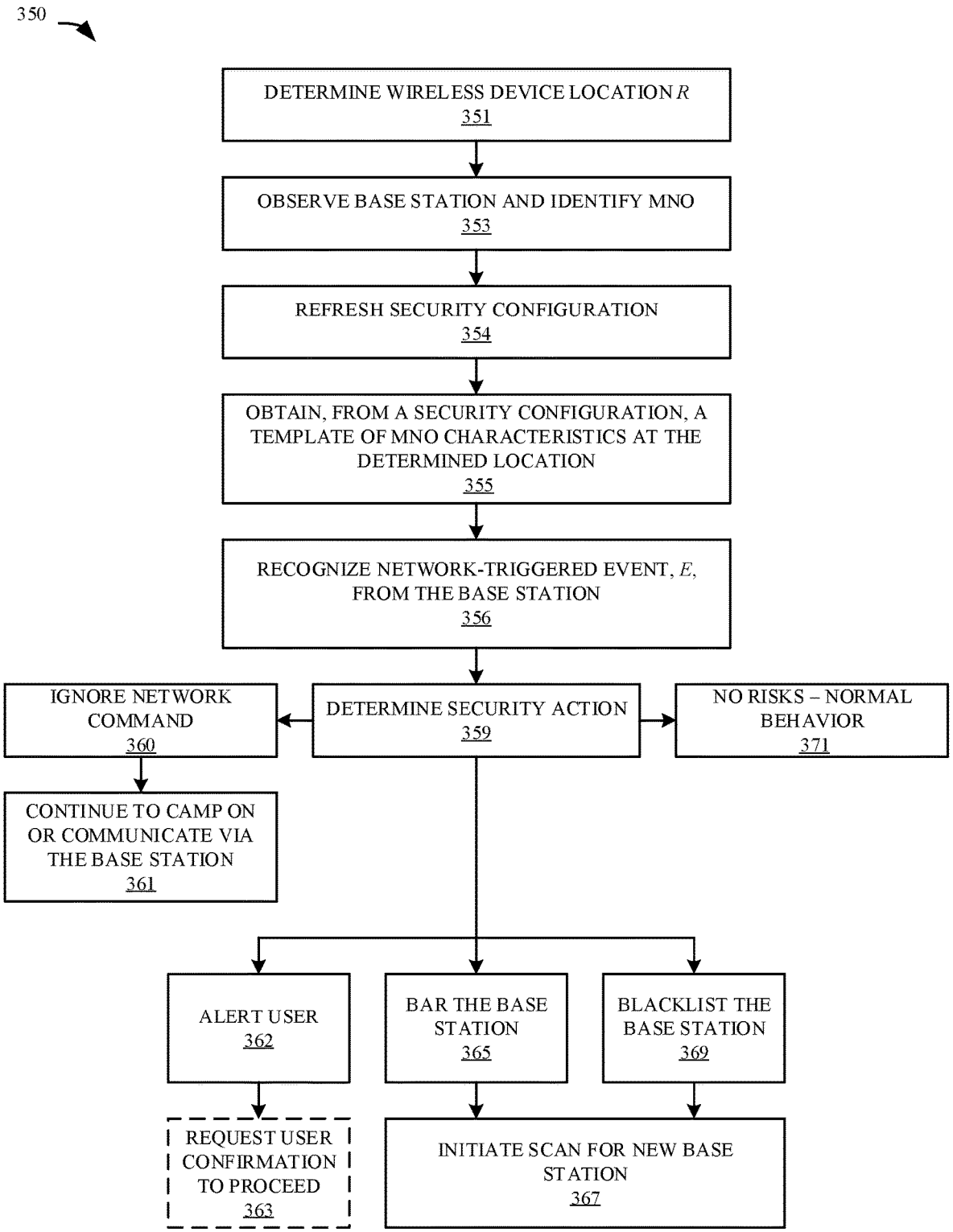

FIG. 3B illustrates a diagram 350 of additional exemplary logic for a cellular security framework, in accordance with some embodiments. At 351, a wireless device 111 determines a location of the wireless device 111, the location denoted as R. The location R may be represented, for example, as a set of geo-coordinates, e.g., a latitude and a longitude, determined by the wireless device 111, or by a regional identifier, e.g., a mobile country code (MCC) broadcast by a network entity of a cellular wireless network and observed by the wireless device 111. At 353, the wireless device 111 observes a base station and identifies an MNO for which services may be provided via a base station. At 354, in some embodiments, the wireless device 111 refreshes a security configuration maintained by the wireless device 111.

At 355, the wireless device 111 obtains, e.g., by reading and/or parsing, from the security configuration, a template of MNO characteristics that may be applicable at the determined location R. A template of MNO characteristics can include a record of information or a quantity of data that includes rules to guide the wireless device 111 concerning various security actions that can be taken by the wireless device 111 under various conditions. In some embodiments, the wireless device 111 accesses information from the security configuration by indexing into the security configuration using the determined location R, e.g., a mobile country code (MCC), and/or using an identity of the MNO, e.g., a mobile network code (MNC).

At 356, the wireless device 111, in some instances, recognizes occurrence of the network-triggered event, denoted as E. The network-triggered event E can be associated with a base station operated by the MNO, for example based on information broadcast by the base station from which the wireless device 111 receives commands to trigger the event E. The base station may be a real base station of a wireless network associated with the MNO. The base station, however, may also be a fake base station that is impersonating a base station of the MNO. An example of a network-triggered event E that may indicate that the base station is not real can include a command to the wireless device 111 to perform a circuit-switched fallback (CSFB) procedure to switch from a 4G or 5G configuration that uses ciphering to a second generation (2G) configuration using a 2G wireless communication protocol that uses no ciphering or weak ciphering. The wireless device 111 at 359 determines a security action to take in response to the network-trigger event E. The wireless device 111 can use the template of MNO characteristics obtained from the security configuration and, in some embodiments, in combination with the particular network-triggered event E, to determine a security action to take. The wireless device 111 can evaluate the network-triggered event E and determine whether actions requested by the network-triggered event E have a high likelihood (e.g., at or above a threshold) of originating from a genuine base station of the MNO or have a low likely (e.g., below the threshold) and therefore may have originated from a fake base station that's impersonating a genuine base station of the MNO. In the diagram 350, the wireless device 111 branches from 359 to one of several different possible security actions indicated as 360, 362, 365, 369, or 371.

In some instances, the wireless device 111, at 360, ignores a network command received from (or indicated by a message from) the base station. For example, in some embodiments, when a base station requests that the wireless device 111 provide an unencrypted identity value for the wireless device 111, such as an international mobile subscriber identity (IMSI) value or an international mobile equipment identity (IMEI) value from the wireless device 111, particularly when such unencrypted information is not expected to be required, the wireless device 111 may ignore the network command to provide such information rather than provide the information. After ignoring the network command, in some embodiments, the wireless device 111, at 361, continues to camp on and/or communicate via the base station from which the network command was received but without having provided the requested identity value.

In some instances, the wireless device 111, at 362, provides an alert to a user of the wireless device 111, e.g., presents a notification via a user interface of the wireless device 111. The wireless device 111, in some embodiments, alerts the user that an ongoing or newly established connection does not include encryption and therefore may be subject to eavesdropping or includes weak encryption that may be vulnerable to hacking. Optionally, at 363, the wireless device 111 requests a confirmation from a user of the wireless device 111, e.g., via an input through a user interface of the wireless device 111, as to whether to proceed to establish a connection or otherwise continue an ongoing action in light of the information presented in the alert notification.

As an example, a customer of $MNO_X$ that normally expects ciphering to be enabled on a home cellular wireless network, e.g., while operating in the United States, can roam onto a visited cellular wireless network in a region that is not covered by the home cellular wireless network, e.g., in China. The user may encounter a situation in which an established connection via the visited cellular wireless network uses weak ciphering or has no ciphering enabled (2G service). In such a case, the wireless device 111 can detect this situation and determine to notify a user of the wireless device 111 that security features, which would normally be expected on a home cellular wireless network are not being used on the visited cellular wireless network. The user of the wireless device 111 can determine any of several different actions to take in response to the notification alert. For example, a user of the wireless device 111 can respond with an indication to proceed normally and continue with the connection on the visited cellular wireless network. Alternatively, a user can also respond to the alert notification from the wireless device 111 by terminating the connection that uses no encryption or only weak encryption. A user of the wireless device 111 can also respond by allowing the connection to proceed but also withholding communication of sensitive information during the connection. While roaming to a different network in a different region is provided as an example, the same logic can apply to a change in connection capability or an unexpected configuration while operating the wireless device 111 on a home cellular wireless network. For example, if $MNO_X$ selectively disables and/or weakens ciphering or authentication procedures while the wireless device 111 operates on the home cellular wireless network, the wireless device 111 can alert the user of the unusual behavior of the home cellular wireless network. The wireless device 111 may be in communication with a fake base station 258, as shown in FIG. 2B, rather than in communication with a real base station 298 of $MNO_X$. When disabling ciphering, when weakening a ciphering configuration, and/or when bypassing all or part of an authentication procedure, a user of the wireless device 111 can be informed of the behavior and in some cases advised of actions to take in response. In some cases, a user of the wireless device 111 can ascertain whether a legitimate network operator is implementing poor security practices.

In some embodiments, the wireless device 111 provides an assessment of security levels via a user interface of the wireless device 111 in response to existing or to proposed connection configurations. In some embodiments, the wireless device 111 informs the user, via a notification alert and/or via a user interface icon, of a current security level, while can be compared to an expect security level for a home cellular wireless network. In some embodiments, the wireless device 111 provides an indication of a ciphering configuration, e.g., whether no ciphering, weak ciphering, or strong ciphering is in use or is proposed for a connection with a base station.

In some instances, the wireless device 111 ignores one or more network commands received from a base station (which can also be referred to as a "cell"). The wireless device 111 can determine to ignore commands received from the base station temporarily, e.g., for a limited period of time, or indefinitely, e.g., for an unlimited period of time until otherwise changed. The wireless device 111 can determine whether to ignore selected commands or all commands received from the base station. The wireless device 111 can assess the network commands to determine a level of malicious activity for the base station. Examples of actions for the wireless device 111 to ignore a base station include blacklisting the base station, at 365, which can add an indicator of the base station to a list of base stations with which the wireless device 111 will not connect, and barring the base station, at 367, which can include ignoring commands from the base station for a limited period of time, e.g., for fifteen minutes.

In some instances, the wireless device 111, at 365, determines a sufficiently high likelihood that the base station is a fake base station, e.g., based on an assessment of various messages received from the base station and/or based on a comparison of information obtained via a database query and/or a history of information maintained by the wireless device 111. In some embodiments, the wireless device 111 places the base station on a temporary barred list of base stations for a limited period of time, and subsequently, at 367, scans for another base station while ignoring any received messages from the temporarily barred base station.

In some instances, the wireless device 111, at 369, determines with certainty that the base station is a fake base station, and places the base station on a blacklist for an indefinite period of time. The wireless device 111, at 367, can subsequently scan for another base station after blacklisting the identified fake base station.

In some instances, the wireless device 111 determines that there is no risk or an acceptably low risk to continue to communicate with the current base station, and proceeds with normal behavior at 371. Normal behavior can include, in some embodiments, accepting pages from the base station, accepting an incoming call from the base station, accepting a short message service (SMS) message from the base station, placing a voice call or establishing a data connection (or both) with the base station, and/or continuing with an ongoing voice all and/or data connection via the base station.

Representative Embodiments

In some embodiments, a method for managing security for a wireless device includes the wireless device: (i) determining a present location, R, of the wireless device; (ii) observing a base station associated with a mobile network operator (MNO); (iii) obtaining a network behavior template, based at least in part on R and MNO, from a security configuration maintained by the wireless device; (iv) recognizing a network-triggered event, E; (v) determining a security action based at least in part on the behavior template and on the network-triggered event E; and (vi) performing the security action.

In some embodiments, the method further includes the wireless device updating the security configuration maintained by the wireless device based at least on information obtained from a network-based server after identifying the MNO. In some embodiments, the network-based server is maintained by an entity other than the MNO. In some embodiments, the network-based server provides information for multiple MNOs. In some embodiments, the network-based server provides information for MNOs on a global basis. In some embodiments, the network-based server provides information for MNOs on a local basis for a region in which the wireless device operates. In some embodiments, the network-triggered event E includes reception by the wireless device of a radio resource control (RRC) command from the base station. In some embodiments, the network-triggered event E includes changing a security setting for the wireless device and/or for a configuration of a connection established (or to be established) between the wireless device and the base station. In some embodiments, the network-triggered event E includes lowering a ciphering capability for a control plane and/or for a user plane to a level that is not consistent with a wireless communication protocol for the MNO. In some embodiments, the network-triggered event E includes requesting unique private information about the wireless device, such as a unique identity for the wireless device. In some embodiments, the network-triggered event E includes reception by the wireless device of a command to communicate with the base station without user plane ciphering. In some embodiments, the network-triggered event E includes reception by the wireless device of a redirection command to communicate with a second base station using a wireless communication protocol that lacks user plane ciphering. In some embodiments, the redirection command is associated with a circuit-switched fallback (CSFB) procedure to transfer communication from the base station to the second base station. In some embodiments, the security action includes providing a notification alert via a user interface of the wireless device. In some embodiments, the security action includes providing an indication of a security setting for communication with the base station via the user interface of the wireless device. In some embodiments, the security action includes ignoring a request to provide an unencrypted unique identifier of the wireless device to the base station. In some embodiments, the unencrypted unique identifier includes an international mobile subscriber identifier (IMSI) or an international mobile equipment identifier (IMEI) of the wireless device. In some embodiments, the security action includes barring connecting with the base station for a limited period of time. In some embodiments, the security action includes adding an identifier of the base station to a blacklist of base stations with which the wireless device is restricted from communicating or establishing a connection. In some embodiments, the security action includes authenticating with the MNO via the base station. In some embodiments, the determining the present location R of the wireless device includes determining a region in which the wireless device operates based at least in part on information obtained from one or more of: a global positioning system (GPS) satellite, a cellular wireless network entity, or a wireless local area network access point. In some embodiments, the information obtained for determining the present location R of the wireless device includes a mobile country code (MCC) obtained from the base station. In some embodiments, the method further includes the wireless device identifying the MNO based at least in part on a mobile country code (MCC) and/or a mobile network code (MNC) received in a message broadcast by the base station. In some embodiments, the security action includes providing a notification alert via a user interface of the wireless device, the notification alert indicating a lack of user plane ciphering and/or signal plane ciphering.

In some embodiments, a wireless device includes (i) wireless circuitry including one or more antennas; and (ii) processing circuitry communicatively coupled to the wireless circuitry and including one or more processors and a memory storing instructions that, when executed by the one or more processors, cause the wireless device to perform actions that include: (a) determining a present location, R, of the wireless device; (b) observing a base station associated with a mobile network operator (MNO); (c) obtaining a network behavior template, based at least in part on R and MNO, from a security configuration maintained by the wireless device; (d) recognizing a network-triggered event, E; (e) determining a security action based at least in part on the behavior template and on the network-triggered event E; and (f) performing the security action.

In some embodiments, the actions performed by the wireless device further include the wireless device updating the security configuration maintained by the wireless device based at least on information obtained from a network-based server after identifying the MNO. In some embodiments, the network-based server is maintained by an entity other than the MNO. In some embodiments, the network-based server provides information for multiple MNOs. In some embodiments, the network-based server provides information for MNOs on a global basis. In some embodiments, the network-based server provides information for MNOs on a local basis for a region in which the wireless device operates. In some embodiments, the network-triggered event E includes reception by the wireless device of a radio resource control (RRC) command from the base station. In some embodiments, the network-triggered event E includes changing a security setting for the wireless device and/or for a configuration of a connection established (or to be established) between the wireless device and the base station. In some embodiments, the network-triggered event E includes lowering a ciphering capability for a control plane and/or for a user plane to a level that is not consistent with a wireless communication protocol for the MNO. In some embodiments, the network-triggered event E includes requesting unique private information about the wireless device, such as a unique identity for the wireless device. In some embodiments, the network-triggered event E includes reception by the wireless device of a command to communicate with the base station without user plane ciphering. In some embodiments, the network-triggered event E includes reception by the wireless device of a redirection command to communicate with a second base station using a wireless communication protocol that lacks user plane ciphering. In some embodiments, the redirection command is associated with a circuit-switched fallback (CSFB) procedure to transfer communication from the base station to the second base station. In some embodiments, the security action includes providing a notification alert via a user interface of the wireless device. In some embodiments, the security action includes providing an indication of a security setting for communication with the base station via the user interface of the wireless device. In some embodiments, the security action includes ignoring a request to provide an unencrypted unique identifier of the wireless device to the base station. In some embodiments, the unencrypted unique identifier includes an international mobile subscriber identifier (IMSI) or an international mobile equipment identifier (IMEI) of the wireless device. In some embodiments, the security action includes barring connecting with the base station for a limited period of time. In some embodiments, the security action includes adding an identifier of the base station to a blacklist of base stations with which the wireless device is restricted from communicating or establishing a connection. In some embodiments, the security action includes authenticating with the MNO via the base station. In some embodiments, the determining the present location R of the wireless device includes determining a region in which the wireless device operates based at least in part on information obtained from one or more of: a global positioning system (GPS) satellite, a cellular wireless network entity, or a wireless local area network access point. In some embodiments, the information obtained for determining the present location R of the wireless device includes a mobile country code (MCC) obtained from the base station. In some embodiments, the actions performed by the wireless device further include the wireless device identifying the MNO based at least in part on a mobile country code (MCC) and/or a mobile network code (MNC) received in a message broadcast by the base station. In some embodiments, the security action includes providing a notification alert via a user interface of the wireless device, the notification alert indicating a lack of user plane ciphering and/or signal plane ciphering.

In some embodiments, an apparatus configurable for operation in a wireless device includes (i) a processor; and (ii) a memory communicatively coupled to the processor and storing instructions that, when executed by the processor cause the wireless device to perform actions that include: (a) determining a present location, R, of the wireless device; (b) observing a base station associated with a mobile network operator (MNO); (c) obtaining a network behavior template, based at least in part on R and MNO, from a security configuration maintained by the wireless device; (d) recognizing a network-triggered event, E; (e) determining a security action based at least in part on the behavior template and on the network-triggered event E; and (f) performing the security action.

In some embodiments, the actions performed by the wireless device further include the wireless device updating the security configuration maintained by the wireless device based at least on information obtained from a network-based server after identifying the MNO. In some embodiments, the network-based server is maintained by an entity other than the MNO. In some embodiments, the network-based server provides information for multiple MNOs. In some embodiments, the network-based server provides information for MNOs on a global basis. In some embodiments, the network-based server provides information for MNOs on a local basis for a region in which the wireless device operates. In some embodiments, the network-triggered event E includes reception by the wireless device of a radio resource control (RRC) command from the base station. In some embodiments, the network-triggered event E includes changing a security setting for the wireless device and/or for a configuration of a connection established (or to be established) between the wireless device and the base station. In some embodiments, the network-triggered event E includes lowering a ciphering capability for a control plane and/or for a user plane to a level that is not consistent with a wireless communication protocol for the MNO. In some embodiments, the network-triggered event E includes requesting unique private information about the wireless device, such as a unique identity for the wireless device. In some embodiments, the network-triggered event E includes reception by the wireless device of a command to communicate with the base station without user plane ciphering. In some embodiments, the network-triggered event E includes reception by the wireless device of a redirection command to communicate with a second base station using a wireless communication protocol that lacks user plane ciphering. In some embodiments, the redirection command is associated with a circuit-switched fallback (CSFB) procedure to transfer communication from the base station to the second base station. In some embodiments, the security action includes providing a notification alert via a user interface of the wireless device. In some embodiments, the security action includes providing an indication of a security setting for communication with the base station via the user interface of the wireless device. In some embodiments, the security action includes ignoring a request to provide an unencrypted unique identifier of the wireless device to the base station. In some embodiments, the unencrypted unique identifier includes an international mobile subscriber identifier (IMSI) or an international mobile equipment identifier (IMEI) of the wireless device. In some embodiments, the security action includes barring connecting with the base station for a limited period of time. In some embodiments, the security action includes adding an identifier of the base station to a blacklist of base stations with which the wireless device is restricted from communicating or establishing a connection. In some embodiments, the security action includes authenticating with the MNO via the base station. In some embodiments, the determining the present location R of the wireless device includes determining a region in which the wireless device operates based at least in part on information obtained from one or more of: a global positioning system (GPS) satellite, a cellular wireless network entity, or a wireless local area network access point. In some embodiments, the information obtained for determining the present location R of the wireless device includes a mobile country code (MCC) obtained from the base station. In some embodiments, the actions performed by the wireless device further include the wireless device identifying the MNO based at least in part on a mobile country code (MCC) and/or a mobile network code (MNC) received in a message broadcast by the base station. In some embodiments, the security action includes providing a notification alert via a user interface of the wireless device, the notification alert indicating a lack of user plane ciphering and/or signal plane ciphering.

Figure 4:
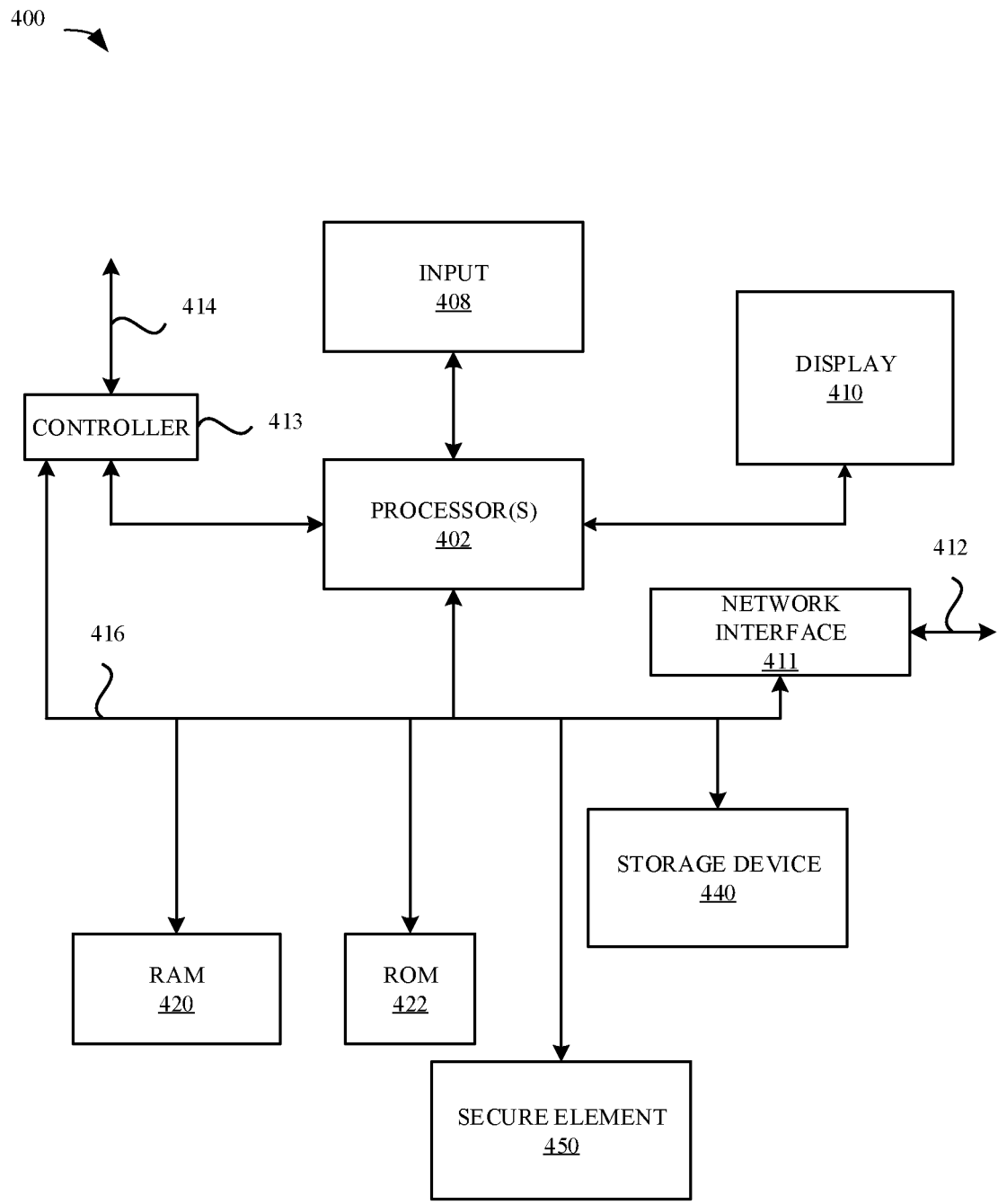
FIG. 4 illustrates a detailed view of a representative computing device that can be used to implement various methods described herein, according to some embodiments.

FIG. 4 illustrates a detailed view of a representative computing device 400 that can be used to implement various methods described herein, according to some embodiments. In particular, the detailed view illustrates various components that can be included in the UE 111. As shown in FIG. 4, the computing device 400 can includes one or more processors 402, which can represent microprocessors and/or controllers for controlling at least a portion of overall operation of computing device 400. The computing device 400 can also include a user input device 408 that allows a user of the computing device 400 to interact with the computing device 400. For example, the user input device 408 can take a variety of forms, such as a button, keypad, dial, touch screen, audio input interface, visual/image capture input interface, input in the form of sensor data, etc. Still further, the computing device 400 can include a display 410 that can be controlled by the processor(s) 402 to display information to the user. A data bus 416 can facilitate data transfer between at least a storage device 440, the processor(s) 402, and a controller 413. The controller 413 can be used to interface with and control different equipment through and equipment control bus 414. The computing device 400 can also include a network/bus interface 411 that couples to a data link 412. In the case of a wireless connection, the network/bus interface 411 can include a wireless transceiver.

The computing device 400 also includes a storage device 440, which can comprise a single disk or a plurality of disks (e.g., hard drives), and includes a storage management module that manages one or more partitions within the storage device 440. In some embodiments, storage device 440 can include flash memory, semiconductor (solid state) memory or the like. The computing device 400 can also include a Random Access Memory (RAM) 420 and a Read-Only Memory (ROM) 422. The ROM 422 can store programs, utilities or processes to be executed in a non-volatile manner. The RAM 420 can provide volatile data storage, and stores instructions related to the operation of the computing device 400. The computing device 400 can further include a secure element (SE) 450, which can represent an eUICC 108 of the UE 111.

The various aspects, embodiments, implementations or features of the described embodiments can be used separately or in any combination. Software, hardware, or a combination of hardware and software can implement various aspects of the described embodiments. The described embodiments can also be embodied as computer readable code on a non-transitory computer readable medium. The non-transitory computer readable medium is any data storage device that can store data, which can thereafter be read by a computer system. Examples of the non-transitory computer readable medium include read-only memory, random-access memory, CD-ROMs, DVDs, magnetic tape, hard disk drives, solid state drives, and optical data storage devices.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method of managing security for a mobile wireless device, the method comprising:
by the mobile wireless device:
determining a present location, R, of the mobile wireless device;
observing a base station associated with a mobile network operator (MNO);
obtaining a network behavior template, based at least in part on R and MNO, from a security configuration maintained by the mobile wireless device, the network behavior template including characteristics of operation of the MNO and rules for security actions for the mobile wireless device under various conditions;
recognizing a network-triggered event, E;
determining, using the network behavior template, whether the network-triggered event E includes requested actions that indicate the base station has a high likelihood of being a fake base station; and
when the determining indicates the base station is likely a fake base station:
determining a security action based at least in part on the network behavior template and on the network-triggered event E; and
performing the security action.

2. The method of claim 1, further comprising:
by the mobile wireless device:
updating the security configuration maintained by the mobile wireless device based at least on information obtained from a network-based server after identifying the MNO and before performing the determining.

3. The method of claim 1, wherein the network-triggered event E includes reception by the mobile wireless device of a radio resource control (RRC) command from the base station.

4. The method of claim 1, wherein the network-triggered event E includes reception by the mobile wireless device of a command to communicate with the base station without user plane ciphering.

5. The method of claim 1, wherein the network-triggered event E includes reception by the mobile wireless device of a redirection command to communicate with a second base station using a wireless communication protocol that lacks user plane ciphering.

6. The method of claim 5, wherein the redirection command is associated with a circuit-switched fallback (CSFB) procedure to transfer communication from the base station to the second base station.

7. The method of claim 1, wherein the security action includes providing a notification alert via a user interface of the mobile wireless device.

8. The method of claim 1, wherein the security action includes ignoring a request to provide to the base station an unencrypted unique identifier of the mobile wireless device.

9. The method of claim 8, wherein the unencrypted unique identifier comprises an international mobile subscriber identifier (IMSI) or an international mobile equipment identifier (IMEI) of the mobile wireless device.

10. The method of claim 1, wherein the security action includes barring connecting with the base station for a limited period of time.

11. The method of claim 1, wherein the security action includes adding an identifier of the base station to a blacklist of base stations with which the mobile wireless device is restricted from communicating or establishing a connection.

12. The method of claim 1, wherein the security action includes authenticating with the MNO via the base station.

13. The method of claim 1, wherein the determining the present location R of the mobile wireless device comprises determining a region in which the mobile wireless device operates based at least in part on information obtained from one or more of: a global positioning system (GPS) satellite, a cellular wireless network entity, or a wireless local area network access point.

14. The method of claim 13, wherein the information comprises a mobile country code (MCC) obtained from the base station.

15. The method of claim 1, further comprising:
by the mobile wireless device:
identifying the MNO based at least in part on a mobile country code (MCC) and/or a mobile network code (MNC) received in a message broadcast by the base station.

16. A mobile wireless device comprising:
wireless circuitry including one or more antennas; and
processing circuitry communicatively coupled to the wireless circuitry and comprising one or more processors and a memory storing instructions that, when executed by the one or more processors, cause the mobile wireless device to perform actions that include:
determining a present location, R, of the mobile wireless device;
observing a base station associated with a mobile network operator (MNO);
obtaining a network behavior template, based at least in part on R and MNO, from a security configuration maintained by the mobile wireless device, the network behavior template including characteristics of operation of the MNO and rules for security actions for the mobile wireless device under various conditions;
recognizing a network-triggered event, E;
determining, using the network behavior template, whether the network-triggered event E includes requested actions that indicate the base station has a high likelihood of being a fake base station; and
when the determining indicates the base station is likely a fake base station:
determining a security action based at least in part on the network behavior template and on the network-triggered event E; and
performing the security action.

17. The mobile wireless device of claim 16, wherein the actions further include:
updating the security configuration maintained by the mobile wireless device based at least on information obtained from a network-based server after identifying the MNO and before performing the determining.

18. The mobile wireless device of claim 16, wherein the network-triggered event E includes reception by the mobile wireless device of a command to communicate with the base station without user plane ciphering.

19. The mobile wireless device of claim 18, wherein the security action includes providing a notification alert via a user interface of the mobile wireless device, the notification alert indicating a lack of user plane ciphering.

20. An apparatus configurable for operation in a mobile wireless device, the apparatus comprising:
a processor; and
a memory communicatively coupled to the processor and storing instructions that, when executed by the processor cause the mobile wireless device to perform actions that include:
determining a present location, R, of the mobile wireless device;
observing a base station associated with a mobile network operator (MNO);
obtaining a network behavior template, based at least in part on R and MNO, from a security configuration maintained by the mobile wireless device, the network behavior template including characteristics of operation of the MNO and rules for security actions for the mobile wireless device under various conditions;
recognizing a network-triggered event, E;
determining, using the network behavior template, whether the network-triggered event E includes requested actions that indicate the base station has a high likelihood of being a fake base station; and
when the determining indicates the base station is likely a fake base station:
determining a security action based at least in part on the network behavior template and on the network-triggered event E; and
performing the security action.

* * * * *